United States Patent [19]

Krishnan et al.

US005778789A

[11] Patent Number: 5,778,789
[45] Date of Patent: Jul. 14, 1998

[54] OFFSET LITHOGRAPHIC PRINTING PROCESS WITH A WATER BASED INK

[75] Inventors: Ramasamy Krishnan, Colonia; Marilyn C. Yamat, Bogota; Hugo Babij, Waldwick, all of N.J.; Roland T. Palmatier, Durham; Robert R. Murray, Madbury, both of N.H.

[73] Assignees: Sun Chemical, Ft. Lee, N.J.; Heidelberg Harris, Heidelberg, Germany

[21] Appl. No.: 614,559

[22] Filed: Mar. 13, 1996

[51] Int. Cl.⁶ .............. C09D 11/08; B41M 1/06
[52] U.S. Cl. .............. 101/450.1; 101/491; 106/31.73
[58] Field of Search .............. 101/450.1, 451, 101/463.1, 491; 106/31.25, 31.6, 31.69, 31.73, 31.75

[56] References Cited

U.S. PATENT DOCUMENTS

| | | | |
|---|---|---|---|
| 3,356,030 | 12/1967 | Greubel | 101/452 |
| 3,877,372 | 4/1975 | Leeds | 101/465 |
| 4,173,554 | 11/1979 | Sulzberg | 260/29.2 |
| 4,278,467 | 7/1981 | Fadner | 106/2 |
| 4,854,969 | 8/1989 | Bassemir et al. | 106/2 |
| 4,903,599 | 2/1990 | Kübler et al. | 101/450.1 |
| 4,954,556 | 9/1990 | Bull et al. | 524/378 |
| 5,039,339 | 8/1991 | Phan et al. | 106/20 R |
| 5,098,478 | 3/1992 | Krishnan et al. | 106/20 R |
| 5,370,906 | 12/1994 | Dankert | 427/261 |
| 5,417,749 | 5/1995 | Krishnan et al. | 106/20 R |
| 5,462,768 | 10/1995 | Adkins et al. | 101/129 |

FOREIGN PATENT DOCUMENTS 4119348  12/1992  Germany.

OTHER PUBLICATIONS

The Printing Ink Manual, Fifth Edition –1993, pp. 571–576.

*Primary Examiner*—Stephen R. Funk
*Attorney, Agent, or Firm*—Sidney Persley

[57] ABSTRACT

An offset lithographic printing process comprising printing at a relative humidity of 75–90% utilizing a water-based, single fluid, fountain solution free, printing ink containing (a) a macromolecular binder composed of binders soluble in water regardless of the pH of the water; resin rosin salt binders soluble in water at a pH from 7.5 to 10; and aqueous emulsion binders; (b) pigment and; (c) a re-wetting agent.

13 Claims, No Drawings

OFFSET LITHOGRAPHIC PRINTING PROCESS WITH A WATER BASED INK

FIELD OF THE INVENTION

The invention relates to an offset lithographic printing process utilizing a water-based ink composition. The process is conducted out at a relative humidity of 75–100% and preferably at a temperature of 10° to 30° C. The ink composition will typically contain water, one or more macromolecular binders, a pigment and a re-wetting agent.

BACKGROUND OF THE INVENTION

In an attempt to eliminate VOC's in the pressroom, water-based alternatives are being sought for ink formulations. Water-based printing inks for use in flexographic printing processes are known in the prior art. This type of printing process utilizes printing plates wherein the printing images stand up in relief, i.e. the areas to be printed are raised above the non-printing areas. Printing by the flexographic process requires relatively low pressure—sufficient pressure is applied to transfer the ink from the face of the image carrier to the surface of the substrate. Examples of useful water-based flexographic printing inks are disclosed in U.S. Pat. No. 4,173,554 and *The Printing Ink Manual*, edited by R. H. Leach and R. J. Pierce, pages 571–576, 5th edition, (Blueprint, 1993).

Water-based inks for gravure printing are also well known. In the gravure process, the printing image is engraved into a cylinder in the form of cells which become filled with ink. Printing is achieved by passing the substrate between the gravure cylinder and impression roller under pressure. Examples of useful water-based gravure printing inks are disclosed in U.S. Pat. Nos. 4,954,556 and 5,098,478.

The offset lithographic printing process presents unique challenges to ink formulators since such process utilizes a planographic printing plate, i.e. the image and non-image areas are in the same plane on the image carrier, and two fluids are concurrently utilized.

It is fairly simple to define an image area by raising it above the background as in the case of the flexographic printing plate or lowering it as in the case of the gravure printing plate; avoidance of ink adhering to the non-image area is not too difficult to achieve. However, when all areas are on the same level, techniques must be utilized to insure that ink adheres only to the image area, and not to the non-image area.

In conventional offset lithographic printing processes, the plate is damped before it is inked with an oil-based ink. Typically, the damping process utilizes a fountain solution such as those described in U.S. Pat. Nos. 3,877,372, 4,278,467 and 4,854,969. Water will form a film on the hydrophilic areas (i.e. the non-image areas) of the printing plate, but will contract into tiny droplets on the oleophilic areas (i.e. the image areas). When an inked roller containing the oil-based ink is passed over the damped plate, it will be unable to ink the areas covered by the water film (the non-image areas), but will emulsify the droplets on the water-repellant areas (the image areas) and these will ink up. Such process is called *offset* lithography because the inked image on the plate does not directly print onto the paper substrate, but is first "offset" onto a rubber blanket, and transferred therefrom onto the paper substrate.

As mentioned above, conventional offset lithographic printing processes entails the use of oil-based inks and water-based fountain solutions. The ink/water balance is critical and is quite demanding of the pressman's skills. This issue is one of the several disadvantages associated with such printing processes as compared to flexographic and gravure printing processes. Moreover, the oil-based inks and aqueous fountain solutions typically employed in conventional offset lithographic printing processes contain fairly high levels of undesirable volatile organic compounds ("VOCs").

U.S. Pat. No. 3,356,030 discloses the use of a water-based printing ink in respect to a method of planographic printing utilizing a lithographic printing plate whose non-image areas are coated with a cured coating of a thermosetting silicone resin. However, the patented method also entails the use of a volatile hydrocarbon fountain solution which will coat the non-image areas and which is re-applied between successive printings. Of course, the use of a volatile hydrocarbon fountain solution undermines the principal purpose of the offset lithographic printing process of the present invention, i.e. the avoidance of the use of volatile organic compounds ("VOCs") during the printing process. Indeed, the offset lithographic printing process utilizes water-based ink compositions without any fountain solution whatsoever.

In the 1980s, a resurgence of interest occurred in respect to "waterless" lithographic printing processes. Both positive and negative waterless planographic printing plates are commercially available from Toray Industries of Japan. The image area of a waterless planographic plate is a photopolymer similar to that employed for the image area of a conventional plate. However, the non-image area is coated with a polymer such as a silicone which is ink repellant. Further information about waterless printing plates and processes may be found in U.S. Pat. Nos. 5,370,906 and 5,417,749.

The waterless printing process solved two issues: VOCs emanating from the fountain solutions and control of the ink/water balance by the pressman. However, the difference in surface energy between the image and non-image areas of the conventional offset lithographic printing plate is typically 40 dynes/cm is dramatically reduced to 20 dynes/cm in the case of the waterless printing plate. Therefore the latitude between scumming and poor print density is considerably narrowed and the issue of VOCs (emanating from the oil-based ink) still remains in respect to waterless printing.

German Offenlegungsschrift DE 41 19 348 A1 pertains to a moistureless offset printing method and a water-based printing ink. The ink described therein is one which will adhere to hydrophilic materials, but not to hydrophobic materials, and contains a dye, water, 5–50% water-soluble macromolecular binder and a hygroscopic liquid, preferably a multihydric alcohol.

OBJECT OF THE INVENTION

It is an object of the present invention to eliminate the principal disadvantages of conventional offset lithographic printing processes, viz. high levels of VOCs emanating from the oil-based ink and the aqueous fountain solution and the difficulty in controlling the ink/water balance, while preserving the principal advantage of the offset lithographic printing process, i.e. high surface energy differential between the image and non-image areas of the printing plate.

Such object has been achieved by means of the offset lithographic printing process of the invention.

DETAILED DESCRIPTION OF THE INVENTION

The offset lithographic printing process of the invention is conducted at a relative humidity of 75–100%, preferably 80–85%. Desirably, the process is conducted at a temperature of 10° to 30° C., preferably 15° to 25° C. The process will utilize a water-based printing ink without the need for any accompanying fountain solution.

The water-based ink for the offset lithographic printing process of the invention may be one which contains water, one or more macromolecular binders, a pigment and a rewetting agent.

The printing plates for use with the offset lithographic printing process of the invention should be such that the image areas thereof are hydrophilic in nature, while the non-image areas are hydrophobic in nature. An example of a suitable printing plate is the "waterless" Toray type discussed above. However, the image area of the plate need not contain a photopolymer. The image area of the plate may comprise, e.g. a grained aluminum surface which has no coating thereon, but is hydrophilic in nature. The non-image area of the plate must, of course, be hydrophobic in nature. However, the non-image area may be covered with any type of hydrophobic material, provided that such hydrophobic material adheres to the non-images area of the plate during the printing process.

A useful water-based printing ink for the offset lithographic printing process of the invention may comprise the following components:

(a) 25 to 60 wt. %, preferably 35 to 50 wt. %, based on the weight of the ink, of water which is present as a continuous phase in the ink;

(b) 10 to 70 wt. %, preferably 30 to 60 wt. %, based on the weight of the ink, of a macromolecular binder comprising:
  (i) macromolecular binders which are soluble in the water phase regardless of the pH of the water phase, present in an amount of 0–5 wt. %, based on the weight of the ink; and
  (ii) macromolecular binders which are soluble in the water phase only at a pre-determined pH value (preferably in the range of about 7.5 to about 10), present in an amount of 10–70 wt. %, based on the weight of the ink; and
  (iii) macromolecular binders comprising aqueous emulsions, present in an amount of 0–20 wt. %, based on the weight of the ink;

(c) a pigment, present in the amount of 2–30 wt. %, preferably 5–20 wt. %, based on the weight of the ink; and (d) a re-wetting agent, present in the amount of 0.5–10 wt. %, based on the weight of the ink.

Examples of suitable macromolecular binders which are soluble in the water phase of the ink regardless of the pH of the water phase include: carboxymethylcellulose, hydroxyethylcellulose, hydroxypropylcellulose, hydroxybutylmethylcellulose, poly($C_1$–$C_4$) alkylene oxides, polyethyleneimine, polyvinyl alcohol, polyvinyl acetate, polyvinylpyrrolidone, polyvinyloxazolidone and polyacrylamide polymers.

Preferably, the macromolecular binders present in the ink are only those macromolecular binders which are soluble in the water phase only at a pre-determined pH value. Such pH value may be acidic, e.g. about 2.5 to about 6.5, but is preferably in the range of about 7.5 to about 10. Suitable examples of such macromolecular binders include methacrylic resins; styrene-acrylic resins; rosin salts; and polystyrenesulfonic acid and its salts. Ammonia or an organic amine such as monoethanolamine or N,N-diethanolamine may be added to the water phase in order to adjust the pH to the preferred value (a mineral acid or an organic acid such as acetic acid may be used to adjust the pH to a value in the range of about 2.5 to about 6.5).

Suitable examples of the macromolecular binders comprising aqueous emulsions include acrylic or vinyl emulsion polymers prepared from monomers selected from the group consisting of acrylic acid esters, methacrylic acid esters, acrylic acid esters of polyhydric alcohols, methyl methacrylate, styrene, vinyl styrene and vinyl acetate.

The pigment may be any of those which are suitable for formulating offset lithographic printing inks such as CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

Suitable examples of rewetting agents include urea, thiourea, hydroxyethyl urea, glycerol, sorbitol, ethylene glycol and butyl carbitol.

Preferably, the water-based printing ink will include a nonionic surfactant, present in the amount of up to 5 wt. %, based on the weight of the ink. Suitable examples of the surfactant include acetylenic glycols, ethoxylated glycols and sorbitan esters.

If desired, the usual adjuvants such as waxes, antifoam agents, biocides, corrosion inhibitors, etc. may be incorporated in the water-based printing ink.

Offset lithographic printing presses having the controls for achieving such desirable relative humidity and temperature levels during the printing process are not within the purview of this invention.

A printing press which could efficiently carry out the offset lithographic printing process of the invention might have the following features:

a) an inking mechanism for applying the ink to the print cylinder;

b) a housing surrounding the inking mechanism and the print cylinder so as to define an enclosed space;

c) a cooling mechanism for cooling the atmosphere within the enclosed space;

d) a humidifier for controlling the humidity of the atmosphere within the enclosed space; and e) means for introducing a chemical substance such as ammonium hydroxide or anhydrous ammonia or an amine such as ethanolamine into the enclosed space in order to insure that the pH is maintained at a desired value of about 7.5 to about 10 (if an acidic pH value is desired, the chemical substance may be a mineral acid or an organic acid such as acetic acid); maintenance of the pH within such range will minimize the likelihood that the water-based ink described above will dry out on the rollers during operation of the press (the water-based inks described above contain macromolecular binders which are predominantly or wholly of the type which are soluble in the water phase of the ink only at a pre-determined desired pH value).

A printing press having the features such as those set forth above would likely also contain sensors and valving mechanisms to insure that the desired temperature, humidity and pH value of the ink are continuously monitored and adjusted as may be necessary throughout the course of the printing operation.

The offset lithographic printing process of the present invention are further illustrated by the following non-limiting examples in which all parts and percentages are by weight, unless otherwise indicated.

EXAMPLE 1

A water-based ink was prepared from the components indicated below. The water phase of the ink was supplied by the water present in the acrylic resin latex, hydroxypropyl cellulose, hydroxyethylethylene urea and the maleated rosin ester:

| Component | Amount, wt. % |
| --- | --- |
| Styrene/maleic anhydride resin | 12 |
| Phthalocyanine Blue pigment | 12 |
| Acrylic resin latex (50 wt. % solids) | 5 |
| Hydroxypropylcellulose (3 wt. % solids) | 10 |
| Hydroxyethylethylene urea (70 wt. % solids) | 8 |
| Monoethanol amine | 2 |
| Polyethylene Wax | 2 |
| Ethoxylated acetylenic diol surfactant | 2 |
| Maleated rosin ester (50 wt. % solids) | 47 |
| Total | 100 |

The printing ink was printed using a Didde press whose printing units, printing plate and printing blankets were enclosed within a chamber in order to control the relative humidity and temperature during the press run.

The printing plate was obtained from Toray industries; the image area of the aluminum oxide substrate was coated with a photopolymer whose surface was hydrophilic in nature, while the non-image area was coated with a silicone polymer. The press run was carried out at a relative humidity in the range of 85–90% and a temperature in the range of 15°–20° C. and the press speed was 1,000 feet/minute (about 500 cm/second).

The prints obtained from this press run were clear and sharp. The print density was 1.5 and the dot gain was 15%. There was no discernible toning in the non-image area.

What is claimed is:

1. An offset lithographic printing process comprising printing at a relative humidity of 75–90%, utilizing a water-based, single fluid, fountain solution free, offset printing ink having:

(a) 10 to 70 wt. % of a macromolecular binder comprised of:

(i) up to 5 wt. % of macromolecular binders soluble in water regardless of the pH of the water;

(ii) 10–70 wt. % of macromolecular resin rosin salt binders soluble in water at a pH ranging from about 7.5 to about 10; and (iii) up to 20 wt. % macromolecular aqueous emulsion binders;

(b) 2–30 wt. % pigment and;

(c) 0.5–10 wt. % of a re-wetting agent.

2. The process of claim 1 wherein the relative humidity is in the range of 80–85%.

3. The process of claim 1 wherein the process is conducted at a temperature in the range of 10° to 30° C.

4. The process of claim 3 wherein the process is conducted at a temperature in the range of 15° to 25° C.

5. The process of claim 1 wherein the macromolecular binder is present in a amount of 30–60 wt. %, based on the weight of the ink.

6. The process of claim 1 wherein the macromolecular binders which are soluble in the water phase regardless of the pH of the water phase are selected from the group consisting of: carboxymethylcellulose, hydroxyethylcellulose, hydroxypropylcellulose, hydroxybutylmethylcellulose, poly($C_1$–$C_4$)alkylene oxides, polyethyleneimine, polyvinyl alcohol, polyvinyl acetate, polyvinylpyrrolidone, polyvinyloxazolidone and polyacrylamide.

7. The process of claim 1 wherein the macromolecular binders which are soluble in the water phase at a pH ranging from about 7.5 to about 10 are selected from the group consisting of methacrylic resins; styrene-acrylic resins; rosin salts; and polystyrenesulfonic acid and its salts.

8. The process of claim 1 wherein the macromolecular binders comprising aqueous emulsions are selected from the group consisting of acrylic or vinyl emulsion polymers prepared from monomers selected from the group consisting of acrylic acid esters, methacrylic acid esters, acrylic acid esters of polyhydric alcohols, methyl methacrylate, styrene, vinyl styrene and vinyl acetate.

9. The process of claim 1 wherein the pigment is present in an amount of 5 to 20 wt. %, based on the weight of the ink.

10. The process of claim 1 wherein the pigment is selected from the group consisting of CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

11. The process of claim 1 wherein the rewetting agent is selected from the group consisting of urea, thiourea, hydroxyethyl ethlylene urea, glycerol, sorbitol, ethylene glycol and butyl carbitol.

12. The process of claim 1 wherein the ink further comprise a nonionic surfactant, present in an amount of up to 5 wt. %, based on the weight of the ink.

13. The process of claim 12 wherein the nonionic surfactant is selected from the group consisting of acetylenic glycols, ethoxylated glycols and sorbitan esters.

* * * * *